(12) United States Patent
Uematsu et al.

(10) Patent No.: US 8,273,493 B2
(45) Date of Patent: Sep. 25, 2012

(54) SOLID ELECTROLYTE FUEL CELL STACK

(75) Inventors: Hideki Uematsu, Kounan (JP);
 Masahiro Shibata, Niwa-gun (JP);
 Hiroshi Sumi, Ichinomiya (JP); Hiroya Ishikawa, Aichi-gun (JP)

(73) Assignee: NGK Spark Plug Co., Ltd., Aichi (JP)

( * ) Notice: Subject to any disclaimer, the term of this patent is extended or adjusted under 35 U.S.C. 154(b) by 277 days.

(21) Appl. No.: 12/279,884

(22) PCT Filed: Jun. 22, 2007

(86) PCT No.: PCT/JP2007/062617
§ 371 (c)(1),
(2), (4) Date: Aug. 19, 2008

(87) PCT Pub. No.: WO2007/148793
PCT Pub. Date: Dec. 27, 2007

(65) Prior Publication Data
US 2010/0119902 A1 May 13, 2010

(30) Foreign Application Priority Data

Jun. 23, 2006 (JP) .................................. 2006-174185

(51) Int. Cl.
*H01M 8/12* (2006.01)
(52) U.S. Cl. ....................................... 429/465; 429/467
(58) Field of Classification Search .................. 429/465, 429/467, 469, 509
See application file for complete search history.

(56) References Cited

U.S. PATENT DOCUMENTS

| 6,461,754 | B1 | 10/2002 | Zeng | |
|---|---|---|---|---|
| 2009/0220833 | A1* | 9/2009 | Jones | 429/22 |

FOREIGN PATENT DOCUMENTS

| JP | 62-020257 A | 1/1987 |
|---|---|---|
| JP | 06-068886 A | 3/1994 |
| JP | 07-320755 A | 12/1995 |
| JP | 08-273691 A | 10/1996 |
| JP | 2001-043871 A | 2/2001 |
| JP | 2001-118588 A | 4/2001 |
| JP | 2004-022343 A | 1/2004 |
| JP | 2004-207008 A | 7/2004 |
| JP | 2005-203255 A | 7/2005 |

* cited by examiner

*Primary Examiner* — Jennifer Michener
*Assistant Examiner* — Monique Wills
(74) *Attorney, Agent, or Firm* — Sughrue Mion, PLLC

(57) ABSTRACT

A solid state electrolyte fuel cell stack includes: layered solid state electrolyte fuel cells, each formed by a solid state electrolyte body having a fuel pole in contact with a fuel gas and an air pole in contact with an oxidant gas; and inter-connectors arranged between the solid state electrolyte fuel cells so as to separate a gas flow path between the solid state electrolyte fuel cells and assure electric conduction between the solid state electrolyte fuel cells. The solid state electrolyte fuel cell stack has two or more air vents for supplying a fuel gas or two or more air vents for supplying the oxidant gas which vents penetrate a part or the whole of the fuel cell stack in the stack layering direction. The different air vents communicate with the different solid state electrolyte fuel cells.

13 Claims, 12 Drawing Sheets

SOLID ELECTROLYTE FUEL CELL STACK

TECHNICAL FIELD

The present invention relates to a solid electrolyte fuel cell stack wherein a plurality of solid electrolyte fuel cells, including a solid electrolyte having a fuel electrode and an air electrode, is stack-layered.

BACKGROUND ART

As a fuel cell, a Solid Oxide Fuel Cell (to be also referred to as SOFC), in which a solid electrolyte (solid oxide) is used, is conventionally known.

Used as the SOFC is a stack wherein, for the purpose of increasing electrical power, a number of fuel cells, having a fuel electrode and an air electrode on each surface of a solid electrolyte formed in, for example, a plate shape, are stack-layered through a separator (for example, interconnector). The SOFC generates electricity by supplying fuel gas (for example, $H_2$, methane, ethanol, and so on) to the fuel electrodes, supplying oxidant gas (for example, air) to the air electrodes, and causing a chemical reaction via the solid electrolyte between the fuel and oxygen contained in the air.

In the above mentioned SOFC stack, a vent for gas introduction is formed inside the SOFC in order to supply fuel gas and oxidant gas to the cell of each layer (so-called internal manifold structure). Gas is supplied to each cell via a flow path of each separator from the vent.

Also, in this type of SOFC stack, each cell is electrically connected in a stack-layering direction. Hence, in order to increase electrical power of the whole stack, it is important how homogeneously and efficiently each cell is operated.

However, when electricity generation is actually performed by the SOFC stack, it is not easy to homogeneously and efficiently operate the cell in each layer. The known reasons for this are because: (a) gas is not uniformly distributed to the cell of each layer, and (b) difference occurs in operating temperature between the end part and the center part of the stack.

As the measures against the above (a), a manifold structure is proposed which enables uniform supply of gas (see Patent Document 1).

Also provided as the measures against the above (b) are an external manifold system which transfers heat in the center part to the end part (see Patent Document 2), and a structure including pipes that are connected to respective layers inside a manifold (see Patent Document 3).

Patent Document 1: Unexamined Japanese Patent Publication No. 2004-207008
Patent Document 2: Unexamined Japanese Patent Publication No. 2004-022343
Patent Document 3: Unexamined Japanese Patent Publication No. 2005-203255

DISCLOSURE OF THE INVENTION

Problems to be Solved by the Invention

In all the techniques according to Patent Documents 1 to 3, piping is complicated so the stack is enlarged in size. There is a problem that a volume energy density is low.

The present invention is made in order to solve the above-described problem. The purpose of the present invention is to provide a solid electrolyte fuel cell stack in which the structure thereof can be simplified as compared to a conventional structure so that the stack can be compact, and the energy density can be improved.

Means for Solving the Problem (1) In a first aspect of the present invention, a solid electrolyte fuel cell stack includes solid electrolyte fuel cells stack-layered therein, and interconnectors disposed between the respective solid electrolyte fuel cells. Each of the solid electrolyte fuel cells includes a solid electrolyte having a fuel electrode, which contacts with fuel gas, and an air electrode, which contacts with oxidant gas. The interconnectors separate a gas flow between the solid electrolyte fuel cells and secure electric conduction between the solid electrolyte fuel cells. Two or more vents for supplying the fuel gas, or two or more vents for supplying the oxidant gas, are provided in the solid electrolyte fuel cells in such a manner that the vents penetrate a part or a whole of the solid electrolyte fuel cell stack in a stack-layering direction of the stack. The different vents communicate with the different solid electrolyte fuel cells.

This aspect of the present invention is concerned with a so-called internal manifold structure. In this aspect of the present invention, two or more vents through which fuel gas flows (or two or more vents through which oxidant gas flows) are provided in a manner to penetrate the solid electrolyte fuel cell stack. The different vents for fuel gas (or of the different vents for oxidant gas) communicate with the different solid electrolyte fuel cells (particularly, fuel gas flow paths or oxidant gas flow paths which are the internal flow paths of the solid electrolyte fuel cells).

Accordingly, if oxidant gas or fuel gas is supplied to each of the solid electrolyte fuel cells via each of the vents formed inside the solid electrolyte fuel cell stack, the supply state (for example, the supply amount, supply temperature, and so on) of oxidant gas or fuel gas in different solid electrolyte fuel cells can be controlled.

Thus, in case that, for example, the temperature or electrical power of the cells is low at both ends in the stack-layering direction of the solid electrolyte fuel cell stack, the temperature of oxidant gas to the cells at both ends can be increased to raise the temperature of the cells at both ends so that the temperature inside the stack is homogenized. Also, the supply amount of fuel gas can be increased to raise electrical power of the cells at both ends so that the electrical power of the whole stack is raised. Especially, in the case of a stack in which cells are electrically connected in series in the stack-layering direction, electrical power of each cell can be homogenized. Therefore, electrical power of the whole stack can be increased.

That is, the internal manifold structure characteristic to the present invention can make the stack compact and also increase electrical power performance of the whole stack by homogenization, and so on, of electrical power of each cell. Thus, there is a remarkable effect that energy density of the stack can be improved.

As the vents, through holes penetrating the stack or bottomed through holes penetrating a part of the stack may be adopted (the same shall apply hereinafter).

(2) In a second aspect of the present invention, the different vents that supply oxidant gas communicate with the different solid electrolyte fuel cells, in the above solid electrolyte fuel cell stack.

In this aspect of the present invention, the different vents for fuel gas communicate with the different solid electrolyte fuel cells, and the different vents for oxidant gas communicate with the different solid electrolyte fuel cells.

Thereby, the supply state of fuel gas and the supply state of oxidant gas can be controlled per different solid electrolyte fuel cell. Thus, there is an advantage that controllability of temperature, electrical power, and so on, of the cells is further improved.

(3) In a third aspect of the present invention, a state of each gas is independently controllable per the different vent, in the above solid electrolyte fuel cell stack.

This aspect of the present invention is concerned with a so-called internal manifold structure. In this aspect of the present invention, two or more vents through which fuel gas flows (or two or more vents through which oxidant gas flows) are provided in a manner to penetrate the solid electrolyte fuel cell stack. The state of fuel gas (or oxidant gas) supplied to the different solid electrolyte fuel cell per the different vent is made independently controllable per each cell.

Accordingly, if oxidant gas or fuel gas is supplied to the respective solid electrolyte fuel cells via the respective vents formed inside the solid electrolyte fuel cell stack, the supply states (for example, the supply amount, supply temperature, and so on) of oxidant gas or fuel gas to the different solid electrolyte fuel cells can be controlled.

Thus, in case that, for example, the temperature or electrical power of the cells is low at both ends in the stack-layering direction of the solid electrolyte fuel cell stack, the temperature of oxidant gas to the cells at both ends can be increased to raise the temperature of the cells at both ends so that the temperature inside the stack is homogenized. Also, the supply amount of fuel gas can be increased to raise electrical power of the cells at both ends so that the electrical power of the whole stack is raised. Especially, in the case of a stack in which cells are electrically connected in series in the stack-layering direction, electrical power of each cell can be homogenized. Therefore, electrical power of the whole stack can be increased.

That is, this aspect of the present invention can make the stack compact and also increase electrical power performance of the whole stack by homogenization, and so on, of electrical power of each cell. Thus, there is a remarkable effect that energy density of the stack can be improved.

(4) In a fourth aspect of the present invention, a state of the oxidant gas is independently controllable per the different vent that supplies the oxidant gas, in the above solid electrolyte fuel cell stack.

In this aspect of the present invention, the state of the fuel gas supplied to the different solid electrolyte fuel cell via the different vent is independently controllable per each cell, and the state of the oxidant gas supplied to the different solid electrolyte fuel cell via the different vent is independently controllable per each cell.

Thereby, the supply state of fuel gas and the supply state of oxidant gas can be controlled per different solid electrolyte fuel cell. Thus, there is an advantage that controllability of temperature, electrical power, and so on, of the cells is further improved.

(5) In a fifth aspect of the present invention, two or more vents for supplying the oxidant gas are provided to control temperature of each cell, in the above solid electrolyte fuel cell stack.

In this aspect of the present invention, the vents are provided for supplying the oxidant gas. Thus, the vents can be used to control temperature of the stack. Controlling the supplied gas per vent (that is, per cell, for example) can decrease difference in temperature inside the stack.

The temperature inside the stack can be controlled by the flow rate of the supplying oxidant gas. That is, the solid electrolyte fuel cell generates heat by electricity generation. Thus, the operating temperature can be reduced by increasing the flow rate of the oxidant gas to discharge heat to the outside. Also, it is desirable that the gas flow rate is larger in the center part of the stack than in the end part of the stack. That is, since the temperature in the center part of the stack tends to be high, the difference in temperature inside the stack can be decreased in this manner.

Moreover, the temperature inside the stack can be controlled by the temperature of the oxidant gas. The temperature of the whole stack can be homogenized, for example by changing the temperature of the oxidant gas per cell, and so on. It is also desirable that the gas temperature is lower in the center part of the stack than in the end part of the stack. That is, since the temperature in the center part of the stack tends to be high, the difference in temperature inside the stack can be decreased in this manner.

(6) In a sixth aspect of the present invention, two or more vents for supplying the fuel gas are provided to control electricity generating volume of each cell, in the above solid electrolyte fuel cell stack.

In this aspect of the present invention, the vents are provided for supplying the fuel gas. Thus, the vents can be used to control electrical power of the stack. Controlling the supplied gas per vent (that is, per cell, for example) allows homogenization of electrical power of each cell.

The electrical power of each cell can be controlled by the flow rate of the supplying fuel gas. That is, electrical power can be raised by increasing the supply amount of the fuel gas. It is also desirable that the flow rate of the fuel gas is larger in the end part of the stack than in the center part of the stack. Since the temperature is low in the end part of the stack, the electrical power tends to be lower in the end part of the stack than in the center part of the stack. Accordingly, the electrical power of each cell can be homogenized in this manner.

(7) In a seventh aspect of the present invention, the above solid electrolyte fuel cell includes a frame portion that encloses a cell body, including the fuel electrode, the air electrode, and the solid electrolyte, from an outer peripheral side in a planar direction of the cell body. Moreover, the frame portion is provided with the vents for fuel gas and the vents for oxidant gas.

This aspect of the present invention gives an example of a structure wherein the vents penetrate the frame portion disposed in the outer peripheral of the solid electrolyte fuel cell.

The frame portion is constituted with a plurality of frames (metallic frames, insulating frames, separators supporting the cell body, and so on) disposed in a stack-layered manner. If there is no frame portion, vents may be disposed in the outer peripheral or in the center of the cell body or the like.

(8) In an eighth aspect of the present invention, the state of the gas (oxidant gas or fuel gas) supplied to the solid electrolyte fuel cell disposed at an end in the stack-layering direction of the solid electrolyte fuel cell stack is controlled.

Even if electricity is generated in the whole solid electrolyte fuel cell stack, the cells disposed at ends in the stack-layering direction are near to external environment. Thus, even if the gas is supplied to the cells disposed at ends in the stack-layering direction in the same manner as to the other cells, the temperature (accordingly, electrical power) of the cells disposed at ends in the stack-layering direction tends to be low.

In that case, the temperature of the cells at both ends is raised to be comparable to that of the other cells, for example, by raising the temperature of oxidant gas, and so on, so that electrical power at both ends can be improved. Or, electrical power itself can be directly improved, for example, by increasing the flow rate of fuel gas, and so on.

Since electric generating performance of the cells in the stack can be homogenized in this manner, electrical power of the whole stack can be improved.

(9) In a ninth aspect of the present invention, the state of the solid electrolyte fuel cell disposed at an end in the stack-layering direction of the solid electrolyte fuel cell stack is feedback controlled to a prescribed state.

For example, if the temperature of the cells on both ends of the solid electrolyte fuel cell stack is low, a feedback control concerning temperature is performed, for example, by adjusting the flow rate of oxidant gas such that the temperature of the cells at both ends is the same as the temperature of the other cells. In this manner, electrical power of each cell can be improved.

Examples of the state of the cell can be the temperature of the cell, the flow rate of gas flowing through the cell, the temperature of gas, and so on.

(10) In a tenth aspect of the present invention, hollow bolts are disposed which penetrate the solid electrolyte fuel cell stack in the stack-layering direction. Internal holes of the hollow bolts are used as the vents of gas.

This aspect of the present invention gives an example of use of internal holes of the hollow bolts as the vents. The hollow bolts can be used as bolts when securing the stack in a stack-layered manner. In other words, a function as a bolt and a function as a gas supply path can be simultaneously used. As a result, a compact stack structure can be achieved.

It is desirable that the number of stack layers of the cells which constitute the solid electrolyte fuel cell stack is small. Two to thirty layers (especially five to fifteen layers) are preferred. Such reduction in number of layers can decrease the number of pipes controlling gas supply. As a result, the stack structure can be simplified.

Also, it is preferable that electrical power per one cell is equal to or above 50 W (especially, equal to or above 100 W). Increase in electrical power per one cell allows generation of a large amount of electricity even with the stack with less number of layers. For example, if cells having an electrical power of 100 W per cell are used, the stack with ten layers can constitute a 1 kW class stack.

The solid electrolyte fuel cell stack can adopt the following structures: (a) a stack-layered structure in which an electricity generating part (that is, the cell body including the air electrode, the solid electrolyte, and the fuel electrode in a stack-layering manner) of the solid electrolyte fuel cell directly contacts with an interconnector; (b) a stack-layered structure in which the cell body contacts with an interconnector via a collecting body; and (c) a stack-layered structure in which the cell body, provided with a frame portion such as a support plate or the like, contacts with the interconnector via a collecting body (or directly). The stack-layered structure of (c) is preferred which is provided with a frame portion supporting the cell body from the outer peripheral side of the cell body, since stress applied to the cell body at the time of stack-layering or operation can be eased.

In order to communicate the vents with the cells in respective layers, a gas flow path provided in the frame portion (for example, formed by creating a recess on the surface of the frame portion), for example, composed of a prescribed interconnector, separator or the like, can communicate with a prescribed through path.

As a combination of communicating each cell with each communication hole, one cell (3) can communicate with one through hole (1), as shown in FIG. 1A. In this case, the flow rate of gas supplied to each cell can be independently controlled. Thus, electricity can be efficiently generated. Moreover, as shown in FIG. 1B, a plurality of cells (7), (9) may communicate with one through hole (5) (one through hole may branch). Such a constitution is effective if stack areas are known where electricity can be generated under the same conditions.

Also as shown in FIG. 1C, a plurality of through holes (13), (15) may communicate with one cell (11). Such a constitution is effective if a gas supply amount to a prescribed cell has to be larger than that to the other cells.

The solid electrolyte has ion conductivity which enables a part of either fuel gas, introduced to the fuel electrode, or oxidant gas, introduced to the air electrode, when the cells are operated, to be moved as ions. Examples of the ions are oxygen ions, hydrogen ions, and so on. Moreover, the fuel electrode contacts with fuel gas which works as a reducing agent, and serves as an anode in cells. The air electrode contacts with oxidant gas which becomes oxidant, and serves as a cathode in cells.

Examples of the material for the solid electrolyte are zirconia electrolyte material (YSZ, ScSZ), ceria electrolyte material (SDC, GDC), perovskite oxide, and so on. Among the aforesaid examples, $ZrO_2$ ceramic (YSZ, ScSZ, and so on) is preferable in which zirconium is stabilized by at least one kind of rare-earth elements, such as Sc, Y, and so on.

As the material for the fuel electrode, a cermet and the like made of, for example, Ni or Ni and ceramic, can be used. Particular examples are a mixture of metal, such as Ni, Fe, and so on, and at least one kind of ceramic, such as $ZrO_2$ ceramic, in which zirconium and the like is stabilized by at least one kind of rare-earth elements, such as Sc, Y, and so on, $CeO_2$ ceramic, and so on. Moreover, metals, such as Pt, Au, Ag, Pd, Ir, Ru, Rh, Ni, Fe, and so on, may be also used. A single kind of these metals may be used, or alloy of two or more kinds of the metals, may be used. Furthermore, a mixture (including cermet) of these metals and/or alloy and at least one kind of the above-described ceramic may be used. Still furthermore, a mixture of oxide of metals, such as Ni, Fe, and so on, and at least one kind of the above-described ceramic may be used.

As the material for the air electrode, perovskite oxide, various noble metal, a cermet made of noble metal and ceramic, and so on, can be used. Particular examples are metals of various kinds, metallic oxide, metallic multiple oxide, and so on. Examples of the metals are Pt, Au, Ag, Pd, Ir, Ru, Rh and so on, or alloy containing two or more kinds of the above-described metals. Furthermore, examples of the metallic oxide are oxide of La, Sr, Ce, Co, Mn, Fe and so on. Still furthermore, examples of the multiple oxide are multiple oxide containing at least La, Pr, Sm, Sr, Ba, Co, Fe, Mn, and so on.

As the material forming the frame portion, materials excelling in heat resistance, chemical stability, strength, and so on may be used. Examples of such materials are ceramic materials, such as alumina, zirconia and so on, and metallic materials, such as stainless steel, thermally-resistant alloy, such as nickel-based alloy, chrome-based alloy, and so on.

Specifically, ferritic stainless steel, martensitic stainless steel, and austenitic stainless steel may be used for the stainless steel.

The interconnectors separate a gas flow between the solid electrolyte fuel cells and secure electric conduction (connection in series) between the solid electrolyte fuel cells. As the material for the interconnectors, the metallic materials, such as conductive stainless steel, thermally-resistant alloy, such as nickel-based alloy, chrome-based alloy, and so on, among the materials excelling in heat resistance, chemical stability, strength, and so on, used for the above-described frame portion may be employed.

If electricity is generated by using a solid electrolyte fuel cell, fuel gas is introduced in a fuel electrode side, and oxidant gas is introduced in an air electrode side.

Examples of the fuel gas are hydrogen, hydrocarbon which works as a reducing agent, mixed gas made of hydrogen and hydrocarbon, fuel gas made by feeding the aforesaid types of gas through water at a predetermined temperature so as to moisturize the gas, fuel gas made with water vapor mixed with the aforesaid types of gas, and so on. The hydrocarbon is not limited to a particular kind, and may be, for example, natural gas, naphtha, coal gasification gas, and so on. Hydrogen is preferable for the fuel gas. Only one kind of the above-described types of fuel gas may be used, or two or more kinds may be used together. The fuel gas may contain inert gas, such as nitrogen, argon and so on, in an amount equal to or smaller than 50 percent by volume.

Examples of the oxidant gas are mixed gas, made of oxygen and other gas, and so on. Moreover, the mixed gas may contain inert gas, such as nitrogen, argon and so on, in an amount equal to or smaller than 80 percent by volume. Atmospheric air (containing nitrogen approximately 80 percent by volume) is preferred, because atmospheric air is safer and less expensive than any other oxidant gas described above.

Figure 1A:
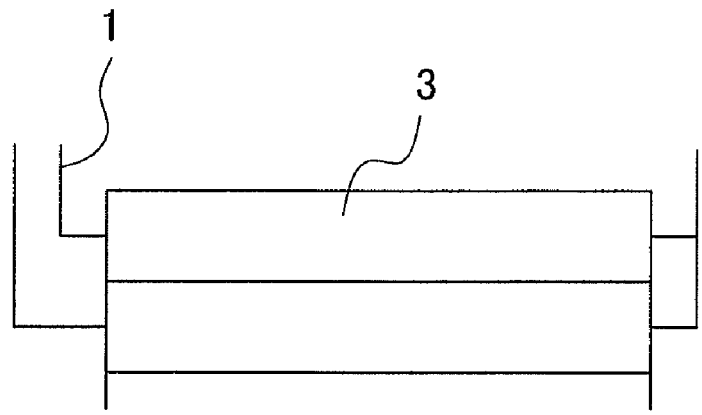
FIGS. 1A-1C are explanatory views showing connection states between a solid electrolyte fuel cell and a vent.
Figure 1B:
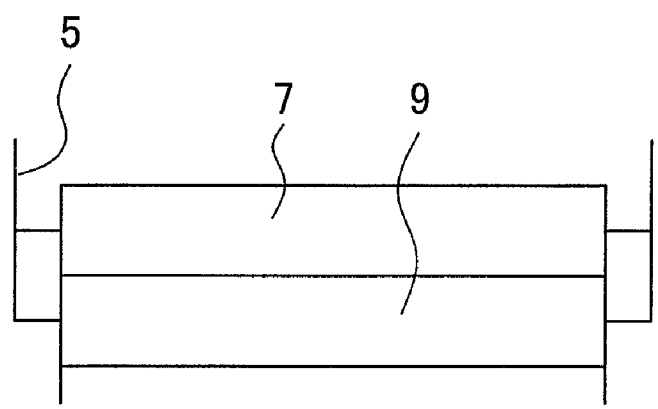
Figure 1C:
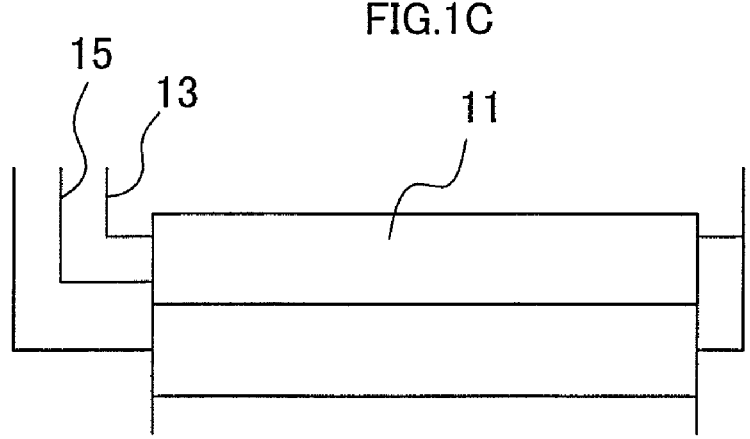

EXPLANATION OF REFERENTIAL NUMERALS 1, 5, 13, 15, 75 . . . vent
21 . . . solid electrolyte fuel cell stack
3, 7, 9, 11, 23 . . . solid electrolyte fuel cell
25 . . . interconnector
29, 30, 31, 32, 33, 34, 35, 36, 37, 38, 39, 40 . . . bolt
45 . . . fuel gas flow path
47 . . . fuel electrode
49 . . . solid electrolyte
51 . . . air electrode
53 . . . air flow path
59 . . . cell body
69 . . . frame portion

BEST MODE FOR CARRYING OUT THE INVENTION

The following describes a preferred example (embodiment) of the present invention, that is, an embodiment of a solid electrolyte fuel cell stack.

Embodiment a) Firstly, the structure of the solid electrolyte fuel cell stack will be described.

Figure 2:
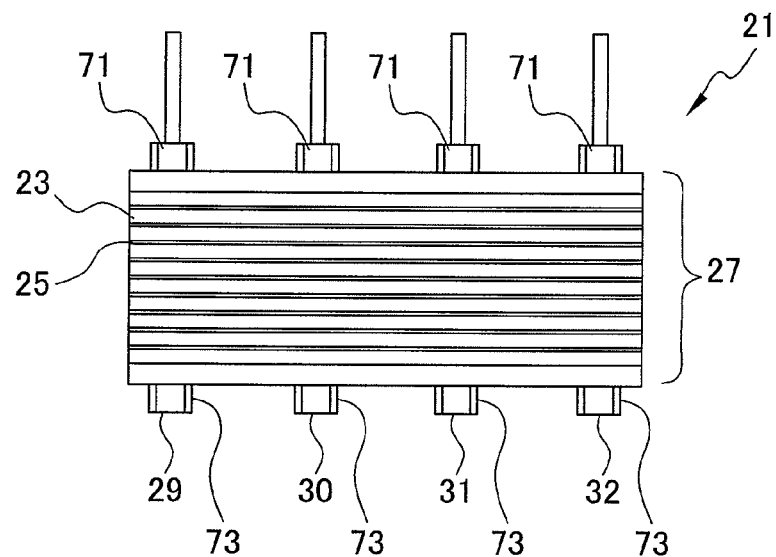
FIG. 2 is a front view showing a solid electrolyte fuel cell stack according to an embodiment.

As shown in FIG. 2, a solid electrolyte fuel cell stack 21 according to the present embodiment is an apparatus that generates electricity when fuel gas (for example, hydrogen) and oxidant gas (for example, atmospheric air (particularly, oxygen contained in the air)) are supplied.

The solid electrolyte fuel cell stack 21 is composed of solid electrolyte fuel cells 23 and interconnectors (plates that keep conduction between the cells 23, and block a passage of gas) 25 alternately disposed in a stack-layering manner.

Figure 3:
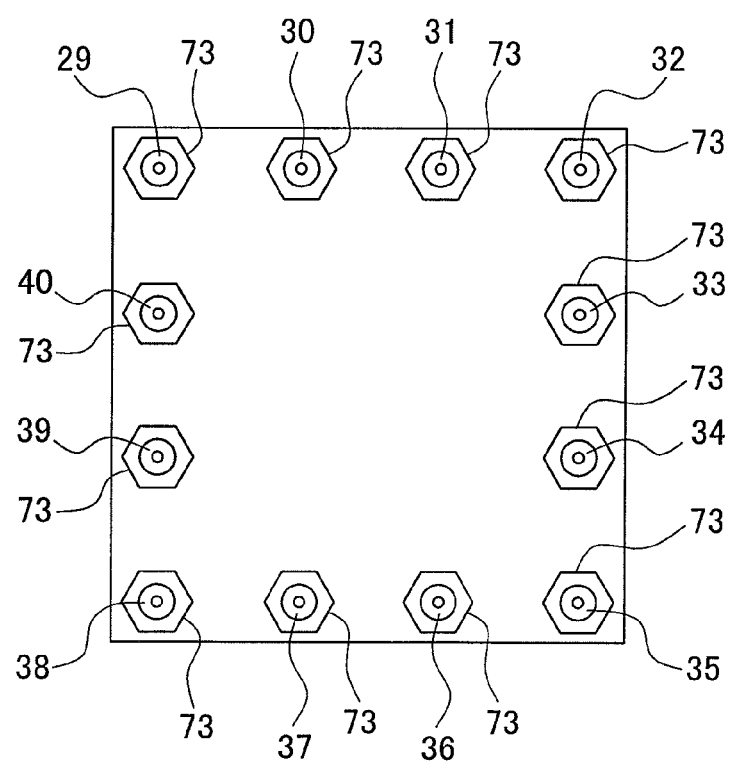
FIG. 3 is an explanatory view showing an arranged state of respective bolts used in the solid electrolyte fuel cell stack, taken from the bottom of FIG. 2.

Particularly, the solid electrolyte fuel cell stack 21 includes a stack-layered body (stack body) 27, bolts 29-40 (see FIG. 3 showing the bottom face downward of FIG. 2), nuts 71, 73 (see FIG. 5), and so on. In the stack-layered body 27, a plurality (for example, ten) of the solid electrolyte fuel cells 23 are disposed in a stack-layered manner via the interconnectors 25. The bolts 29-40 are disposed in the outer peripheral of the stack-layered body 27, and penetrate the stack-layered body 27 in the stack-layering direction. The nuts 71, 73 are threadably engaged with the respective bolts 29-40.

Since the interconnectors 25 are shared between the adjacent solid electrolyte fuel cells 23, only one interconnector 25 is provided between the cells 23, except for the solid electrolyte fuel cells 23 disposed in the upper end and the lower end. The interconnectors 25 in the upper end and the lower end will be referred to as outer connectors.

Figure 4:
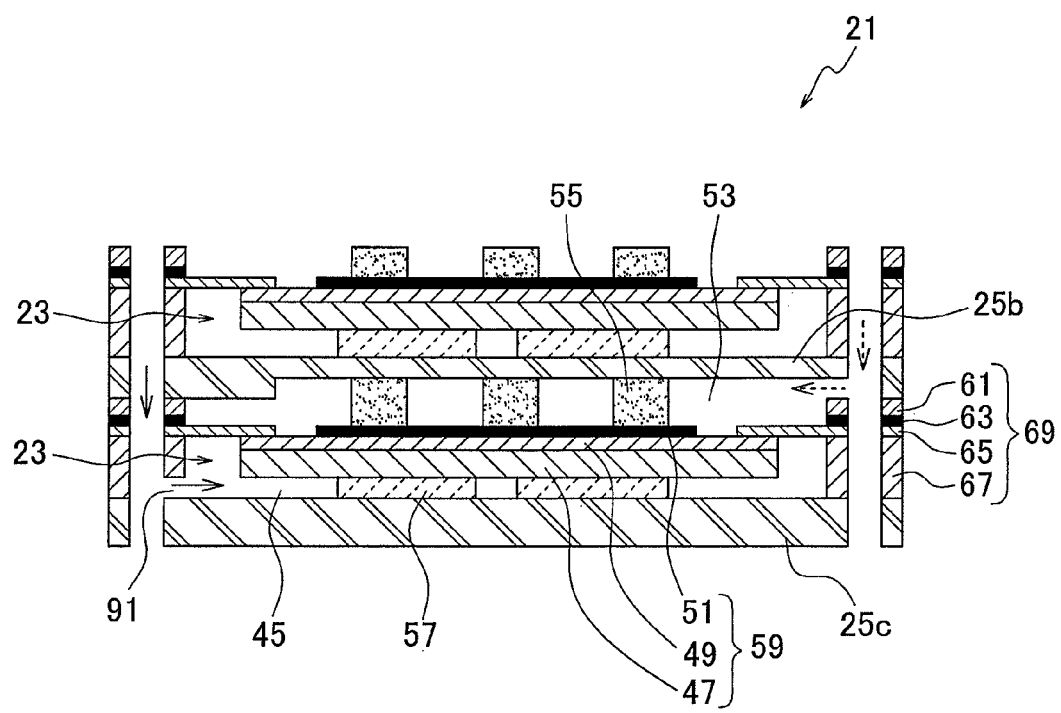
FIG. 4 is a diagram showing a part of the solid electrolyte fuel cell stack in section.

As shown in a diagrammatic manner in FIG. 4, the solid electrolyte fuel cell 23 is a cell of so-called fuel electrode supporting membrane type. In the side where a fuel gas flow path 45 is provided, a fuel electrode (anode) 47 is disposed. On the surface of the fuel electrode 47, which is the upper surface in the drawing, a solid electrolyte 49 is formed in a film manner. On the surface of the solid electrolyte 49, which is the surface positioned in the side where an air flow path 53 is provided, an air electrode (cathode) 51 is formed.

Between the air electrode 51 and a metallic interconnector 25b disposed above the air electrode 51, power collectors 55 (which is made of, for example, LSCF ($La_{0.6}Sr_{0.4}Co_{0.2}Fe_{0.8}O_3$), LSM ($La_{0.6}Sr_{0.4}MnO_3$), and the like that are similar to the air electrode 51) are disposed so as to secure the electric conduction. Likewise, power collectors 57 are disposed between the fuel electrode 47 and an interconnector 25c disposed below the fuel electrode 47. The fuel electrode 47, the solid electrolyte 49, and the air electrode 51 will be referred to altogether as a cell body 59.

That is, in the present embodiment, the solid electrolyte fuel cell 23 includes the cell body 59, a pair of upper and lower power collectors 55, 57, a metallic air electrode frame 61, a ceramic insulating frame 63, a metallic separator (support plate) 65, and a metallic fuel electrode frame 67. The air electrode frame 61 is disposed in the side where the air flow path 53 is provided. The separator 65 is connected to the cell body 59 to support the cell body 59, and blocks the passage of gas. The fuel electrode frame 67 is disposed in the side where the fuel gas flow path 45 is provided.

The air electrode frame 61, the insulating frame 63, the separator 65, and the fuel electrode frame 67 constitute a frame portion 69 of the solid electrolyte fuel cell 23, through which the bolts 29-40 penetrate.

b) Now, the bolts 29-40 will be described.

The bolts 29-40 are used for pressing each of the solid electrolyte fuel cells 23, the interconnectors 25, and so on, in the stack-layering direction, and restraining the stack-layered body 27 in one body. The bolts 29-40 are also used for supplying and discharging fuel gas and air to and from the respective cells 23.

Particularly, as shown in FIG. 3, the first bolt 29 supplies fuel gas to the cell 23 in the ninth layer. The second bolt 30 supplies fuel gas to the cell 23 in the tenth layer. The third bolt 31 supplies air to the cell 23 in the first layer. The fourth bolt 32 supplies air to the cell 23 in the second layer. The fifth bolt 33 exhausts fuel gas from all the cells 23. The sixth bolt 34 supplies air to the cell 23 in the third to eighth layers. The seventh bolt 35 supplies air to the cell 23 in the ninth layer. The eighth bolt 36 supplies air to the cell 23 in the tenth layer. The ninth bolt 37 supplies fuel gas to the cells 23 in the first layer. The tenth bolt 38 supplies fuel gas to the cell 23 in the second layer. The eleventh bolt 39 exhausts air from all the cells 23. The twelfth bolt 40 supplies fuel gas to the cells 23 in the third to eighth layers. The first layer, the second layer, . . . , nth layer represent the position of the cell 23 (position of the layer) counted from the top in FIG. 2.

Here, the shape of the bolts 29-40 will be described, focusing attention on one bolt as an example (the respective bolts 29-40 are the same in shape).

Figure 5:
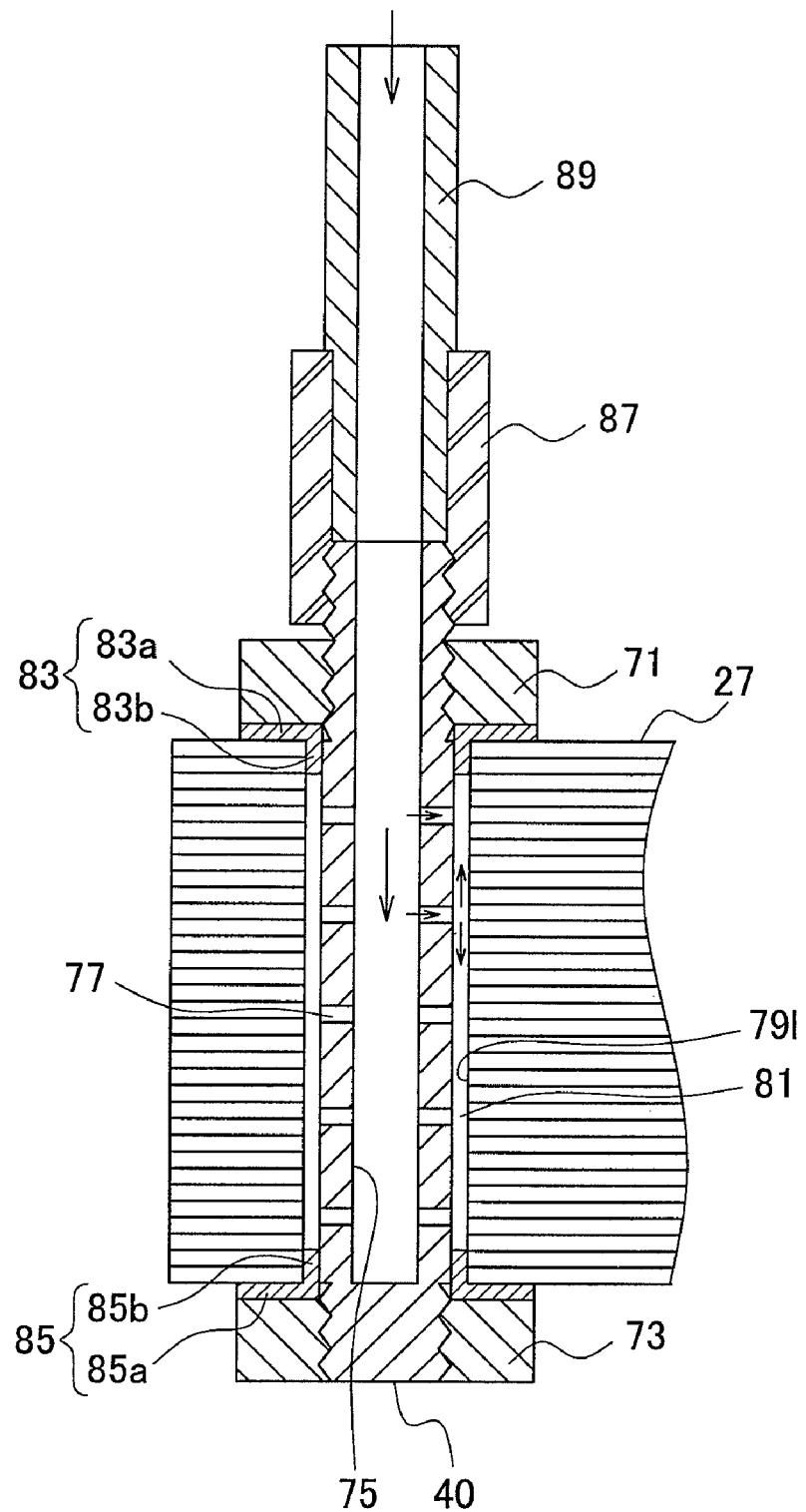
FIG. 5 is an explanatory view showing a bolt in section and a state of use of the bolt.

As shown in FIG. 5, the twelfth bolt 40, for example, is a long columnar bolt having a hollow. To both of the upper and lower ends of the twelfth bolt 40, nuts 71, 73 are threadably engaged. The example described here uses a pair of hexagonal nuts 71, 73. However, an ordinary headed bolt which fastens a nut only in one end thereof can be used.

In the shaft center of the twelfth bolt 40, a bottomed vent 75 used as the passage of gas is provided so as to extend approximately up to the position of the top surface of the nut 73 shown in the lower side of the drawing. A plurality of lateral holes 77 are formed so as to extend from the vent 75 in the radial direction (in the left-to-right direction in the drawing).

The twelfth bolt 40 is inserted through a twelfth through hole 79*l* provided in the vicinity of the outer peripheral of the stack-layered body 27 (in the stack-layering direction). Between the outer peripheral surface of the twelfth bolt 40 and the inner peripheral surface of the twelfth through hole 79*l*, a cylindrical space 81 is formed, which is to be used as the passage of gas.

In the up-and-down direction of the twelfth bolt 40, insulating rings 83, 85 in a flange shape are externally fitted between the respective nuts 71, 73 and the stack-layered body 27. Due to flange portions 83*a*, 85*a* of the insulating rings 83, 85 being interposed between the respective nuts 71, 73 and the stack-layered body 27, a clearance is maintained between the twelfth bolt 40 and the stack-layered body 27. Moreover, due to cylinder portions 83*b*, 85*b* of the insulating rings 83, 85 being disposed between the twelfth bolt 40 and the stack-layered body 27, the above-described space 81 is maintained.

Accordingly, fuel gas supplied to the space 81 via the lateral holes 77, for example, from the vent 75, is supplied to a prescribed cell 23 via a prescribed opening 91 which communicates with this space 81 (see FIG. 4). That is, in the case of the twelfth bolt 40, since the opening 91 is provided in each of the cells 23 in the third to eighth layers, fuel gas is introduced into the cells 23 via the openings 91.

A joint 87 is threadably engaged with the upper end of the twelfth bolt 40. To the joint 87, a gas pipe 89 for gas supply (or for exhaust) is attached.

c) The following describes the structure to form the passage of gas in the respective cells 23.

FIGS. 6A-6E and FIGS. 7A-7E are drawings viewed from the undersurface in FIG. 2.

Figure 6:
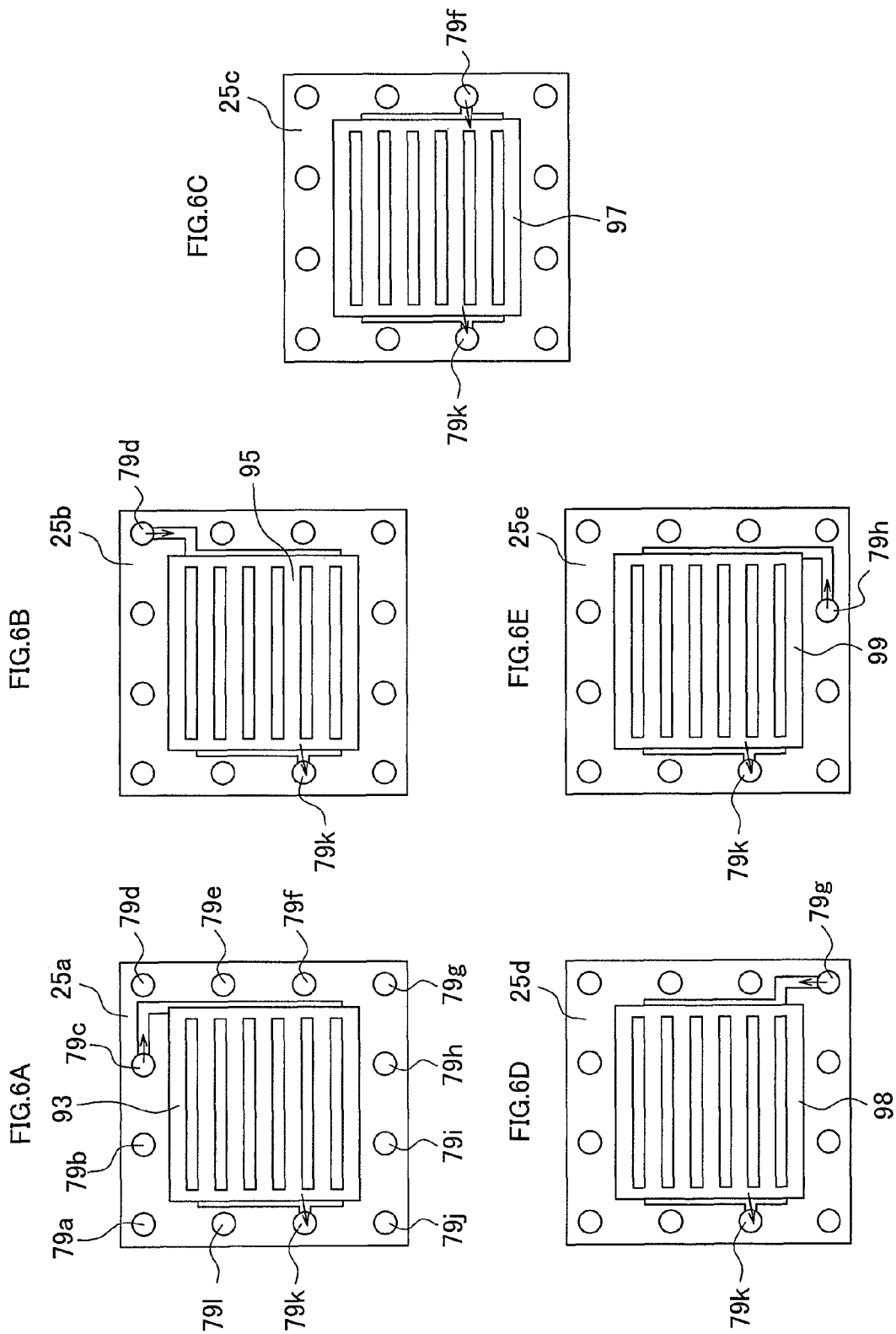
FIGS. 6A-6E are explanatory views showing a passage of air in each interconnector.

(1) Surface structure of the interconnector 25, which forms the passage in the side where the air electrode 51 is disposed FIG. 6A shows an interconnector (outer connector) 25*a* disposed in the upper end of FIG. 2. A recess 93, which becomes a path through which air flows, is formed on the undersurface of the outer connector 25*a*. The recess 93 communicates with a third through hole 79*c* through which the third bolt 31 (for air supply to the cell 23 in the first layer) is inserted, and also communicates with an eleventh through hole 79*k* through which the eleventh bolt 39 (for air exhaust from all the cells 23) is inserted. Each of the interconnectors 25 is provided with the first to twelfth through holes 79*a*-1 through which the first to twelfth bolts 29-40 are respectively inserted.

FIG. 6B shows an interconnector 25*b* disposed between the cells 23 in the first layer and the second layer. A recess 95, which becomes a path through which air flows, is formed on the undersurface of the interconnector 25*b*. The recess 95 communicates with a fourth through hole 79*d* through which the fourth bolt 32 (for air supply to the cell 23 in the second layer) is inserted, and also communicates with the eleventh through hole 79*k* through which the eleventh bolt 39 (for air exhaust from all the cells 23) is inserted.

FIG. 6C shows an interconnector 25*c* disposed respectively between the cells 23 in the second layer and the third layer, the third layer and the fourth layer, the fourth layer and the fifth layer, the fifth layer and the sixth layer, the sixth layer and the seventh layer, and the seventh layer and the eighth layer. A recess 97, which becomes a path through which air flows, is formed on the undersurface of the interconnector 25*c*. The recess 97 communicates with a sixth through hole 79*f* through which the sixth bolt 34 (for air supply to the cells 23 in the third to eighth layers) is inserted, and also communicates with the eleventh through hole 79*k* through which the eleventh bolt 39 (for air exhaust from all the cells 23) is inserted.

FIG. 6D shows an interconnector 25*d* disposed between the cells 23 in the eighth layer and the ninth layer. A recess 98, which becomes a path through which air flows, is formed on the undersurface of the interconnector 25*d*. The recess 98 communicates with a seventh through hole 79*g* through which the seventh bolt 35 (for air supply to the cell 23 in the ninth layer) is inserted, and also communicates with the eleventh through hole 79*k* through which the eleventh bolt 39 (for air exhaust from all the cells 23) is inserted.

FIG. 6E shows an interconnector 25*e* disposed between the cells 23 in the ninth layer and the tenth layer. A recess 99, which becomes a path through which air flows, is formed on the undersurface of the interconnector 25*e*. The recess 99 communicates with a eighth through hole 79*h* through which the eighth bolt 36 (for air supply to the cell 23 in the tenth layer) is inserted, and also communicates with the eleventh through hole 79*k* through which the eleventh bolt 39 (for air exhaust from all the cells 23) is inserted.

Figure 7:
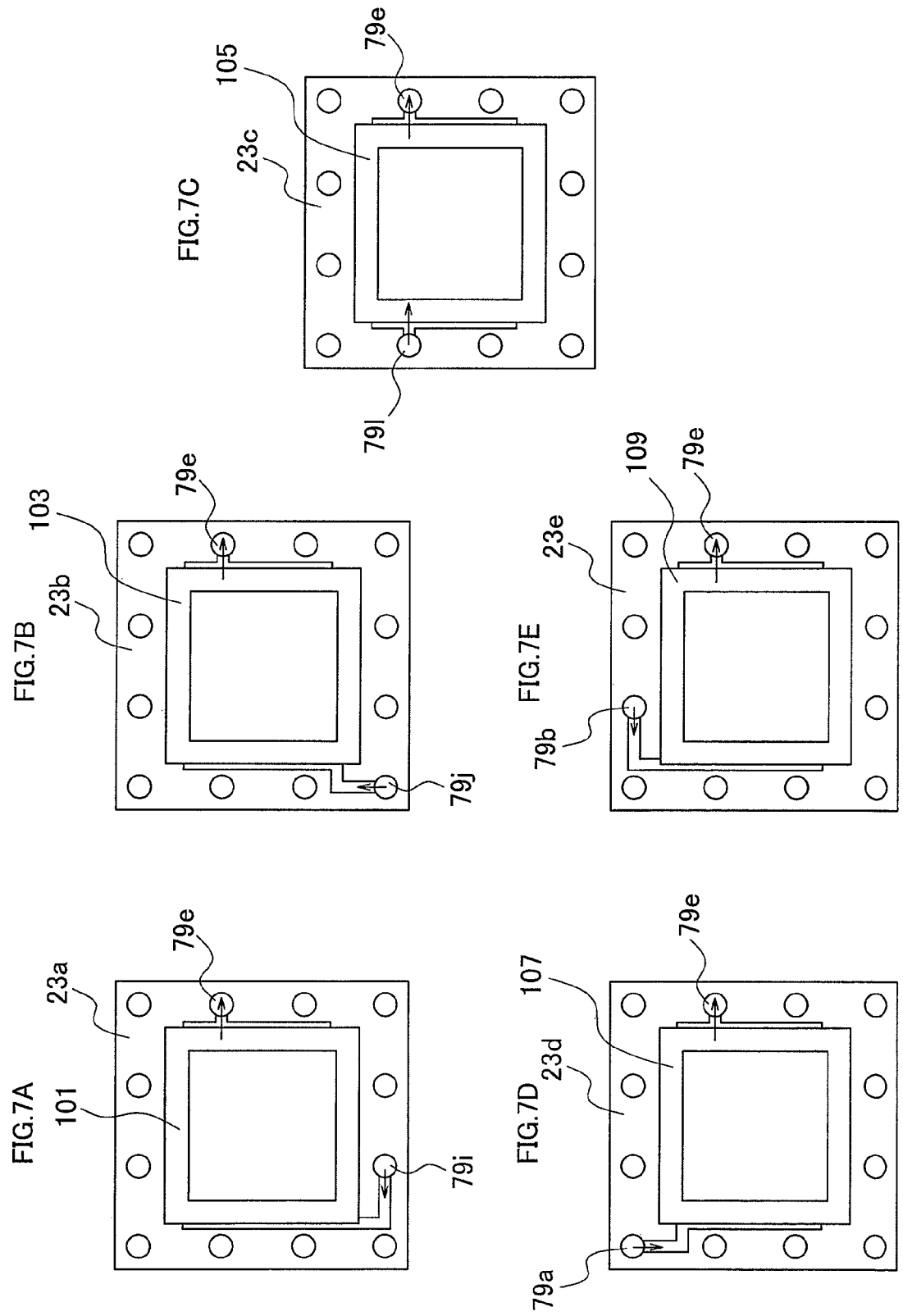
FIGS. 7A-7E are explanatory views showing a passage of fuel gas in each cell.

(2) Surface structure in the fuel electrode side of the cell 23, which forms the passage in the side where the fuel electrode 47 is disposed FIG. 7A shows the side where the fuel electrode 47 of a first-layer cell 23*a* is disposed. A recess 101, which becomes a passage through which fuel flows, is formed on the undersurface of the cell 23a. The recess 101 communicates with a ninth through hole 79i through which the ninth bolt 37 (for fuel supply to the first-layer cell 23a) is inserted, and also communicates with a fifth through hole 79e through which the fifth bolt 33 (for fuel exhaust from all the cells 23) is inserted.

FIG. 7B shows the side where the fuel electrode 47 of a second-layer cell 23b is disposed. A recess 103, which becomes a passage through which fuel flows, is formed on the undersurface of the cell 23b. The recess 103 communicates with a tenth through hole 79j through which the tenth bolt 38 (for fuel supply to the second-layer cell 23b) is inserted, and also communicates with the fifth through hole 79e through which the fifth bolt 33 (for fuel exhaust from all the cells 23) is inserted.

FIG. 7C shows the side where the fuel electrode 47 of third to eighth-layer cells 23c is disposed. A recess 105, which becomes a passage through which fuel flows, is formed on the undersurface of the cells 23c. The recess 105 communicates with a twelfth through hole 79l through which the twelfth bolt 40 (for fuel supply to the third to eighth-layer cells 23b) is inserted, and also communicates with the fifth through hole 79e through which the fifth bolt 33 (for fuel exhaust from all the cells 23) is inserted.

FIG. 7D shows the side where the fuel electrode 47 of a ninth-layer cell 23d is disposed. A recess 107, which becomes a passage through which fuel flows, is formed on the undersurface of the cell 23d. The recess 107 communicates with a first through hole 79a through which the first bolt 29 (for fuel supply to the ninth-layer cell 23d) is inserted, and also communicates with the fifth through hole 79e through which the fifth bolt 33 (for fuel exhaust from all the cells 23) is inserted.

FIG. 7E shows the side where the fuel electrode 47 of the tenth-layer cell 23e is disposed. A recess 109, which becomes a passage through which fuel flows, is formed on the undersurface of the cell 23e. The recess 109 communicates with a second through hole 79b through which the second bolt 30 (for fuel supply to the tenth-layer cell 23d) is inserted, and also communicates with the fifth through hole 79e through which the fifth bolt 33 (for fuel exhaust from all the cells 23) is inserted.

d) The following briefly describes a method for producing the solid electrolyte fuel cell stack 21.

Firstly, a plate member (SUS 430), for example, is punched out so as to produce the interconnector 25, the air electrode frame 61, the fuel electrode frame 67, and the separator 65.

In accordance with a common method, a green sheet, mainly made of spinel, is formed into a predetermined shape, and sintered so as to produce the insulating frame 63.

The cell body 59 of the solid electrolyte fuel cell 23 is produced in accordance with a common method. Specifically, the materials of the solid electrolyte 49 are printed on the green sheet to be used as the fuel electrode 47, and sintered. Then, the materials of the air electrode 51 are printed over the materials of the solid electrolyte 49, and further sintered. The cell body 59 is secured to the separator 65 by brazing.

In addition, the bolts 29-40 for air and for fuel are produced in accordance with the procedure described below.

Specifically, spot facing is performed at the axial center of a round bar (SUS 430), for example, having a size of diameter: 15 mm×length: 120 mm, in order to make the vent 75 having a size of inner diameter: 9 mm×depth: 100 mm.

Subsequently, both of the top end and the bottom end of the outer peripheral of the round bar are threaded so as to make a thread portion having a length of 30 mm and a thread portion having a length of 20 mm.

Then, along the axial direction of the round bar, the plurality of lateral holes 77, having a diameter of 2 mm, are formed at equal intervals in the radial direction, so that the vent 75 and the outer peripheral side of the round bar are communicated. As a result, the bolts 29-40 are completed.

Subsequently, the above-described interconnector 25, the air electrode frame 61, the fuel electrode frame 67, the separator 65 to which the cell body 59 is attached by brazing, the power collectors 55, 57, and so on, are integrated so as to assemble each of the solid electrolyte fuel cell 23. The solid electrolyte fuel cells 23 are stack-layered so as to form the stack-layered body 27.

Then, the bolts 29-40 are inserted into the respective through holes 79a-j of the stack-layered body 27. From both ends of the bolts 29-40, the insulating spacers 83, 85 are fitted, and the nuts 71, 73 are threadably engaged with the both ends of the bolts 29-40.

Subsequently, the nuts 71, 73 are fastened so as to press and secure the stack-layered body 25 in an integrated manner. As a result, the solid electrolyte fuel cell stack 21 is completed.

e) The following describes various controls of the solid electrolyte fuel cell stack 21 of the present embodiment.

(1) Main Routine

Figure 8:
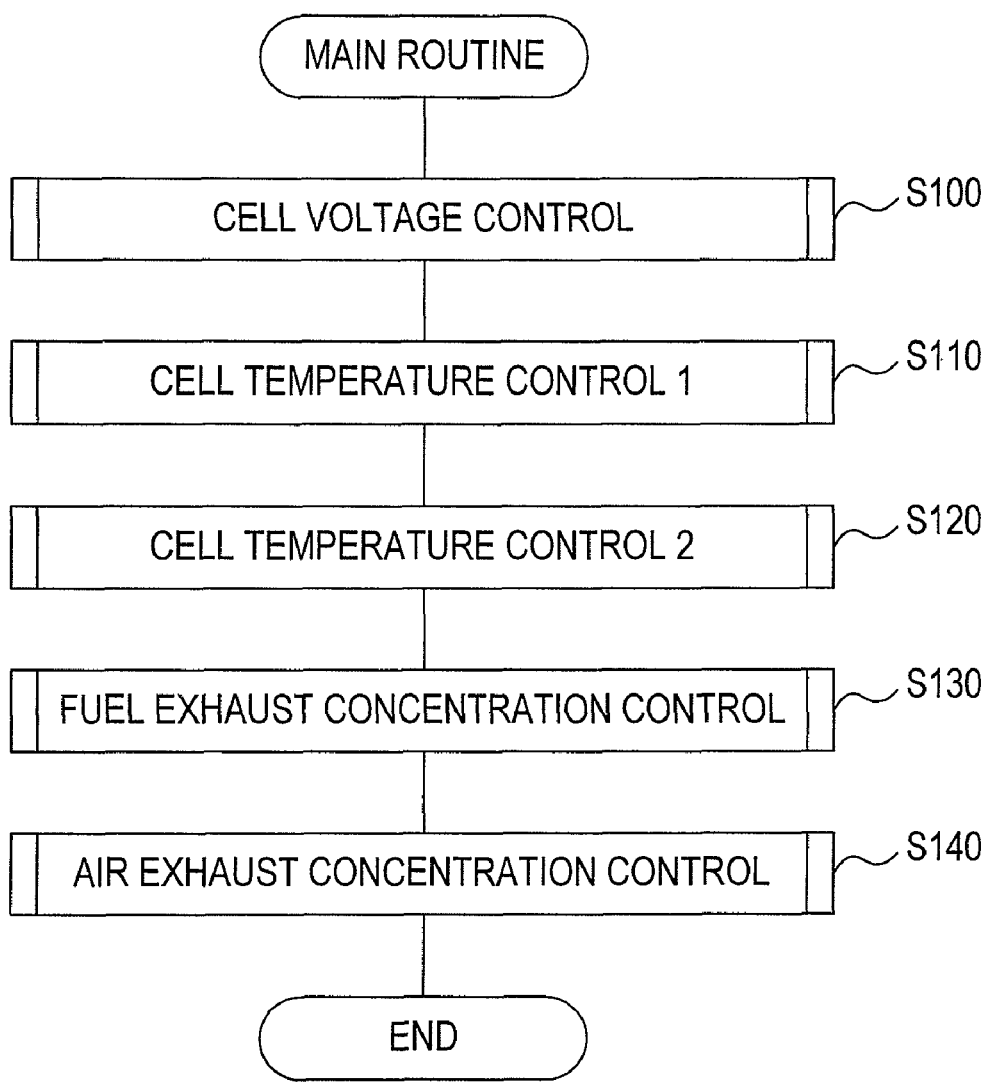
FIG. 8 is a flowchart illustrating a main routine of control according to the embodiment.

As shown in FIG. 8, in the present embodiment, when fuel gas and air are supplied to the solid electrolyte fuel cell stack 21 to generate electricity, cell voltage control is performed in step (S) 100, cell temperature control 1 is performed in step 110, cell temperature control 2 is performed in step 120, fuel exhaust concentration control is performed in step 130, and air exhaust concentration control is performed in step 140, as to be explained later in details. Then, the present process is ended.

Only a part of the steps 100-140 may be performed.

(2) Cell Voltage Control

Cell voltage control is a process to feedback control the voltage generated in the respective cells 23 to be constant by adjusting the supply amount of fuel gas.

Figure 9:
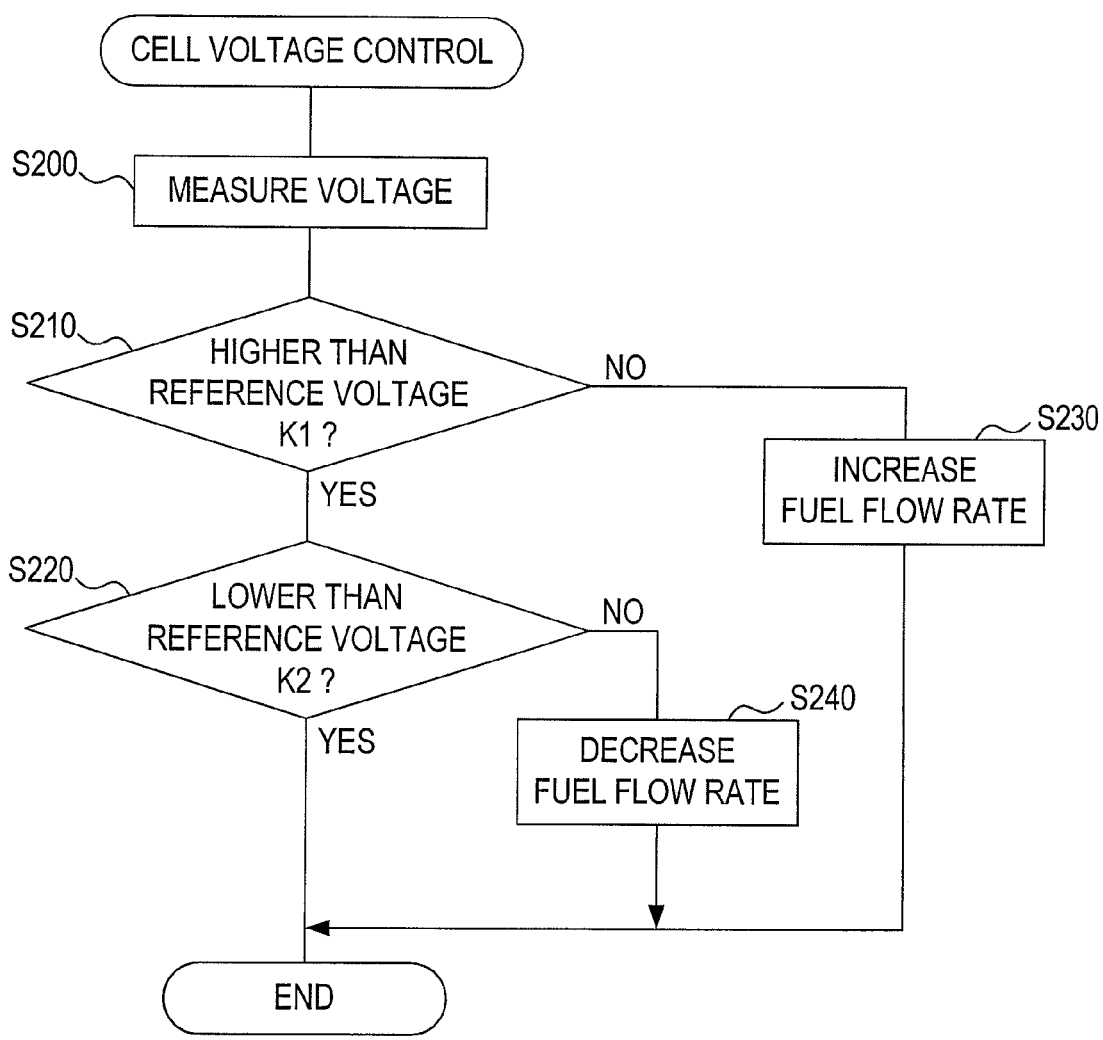
FIG. 9 is a flowchart illustrating a cell voltage control.

In the present process, the voltage generated in the respective cells 23 is measured in step 200, as shown in FIG. 9. The voltage can be obtained by measuring the voltage between the interconnectors 25 on both sides of the respective cells 23.

In the subsequent step 210, it is determined whether the voltage generated in the cells 23 is higher than a reference voltage K1. If positively determined, the process moves to step 220. If negatively determined, the process moves to step 230.

In step 230, since the voltage generated in the cells 23 is lower than a desired voltage range (K1-K2: K1<K2), a process of increasing the fuel flow rate is performed to raise the voltage. The present process is ended.

In step 220, it is determined whether the voltage generated in the cells 23 is lower than a reference voltage K2. If positively determined, the present process is ended. If negatively determined, the process moves to step 240.

In step 240, since the voltage generated in the cells 23 is higher than the desired voltage range, a process of decreasing the fuel flow rate is performed to lower the voltage. The present process is ended.

Thereby, the voltage of the cells 23 can be controlled into the desired voltage range.

For example, if the voltage generated in the cells 23 on both ends of the stack 21 (the first, second, ninth, and tenth-layer cells) is low, fuel gas to be supplied to the corresponding ninth, tenth, first, and second bolts 37, 38, 29, and 30 is controlled to be decreased.

(3) Cell Temperature Control 1

Cell temperature control 1 is a process to feedback control the temperature of the respective cells 23 to be constant by adjusting the supply amount of fuel gas.

Figure 10:
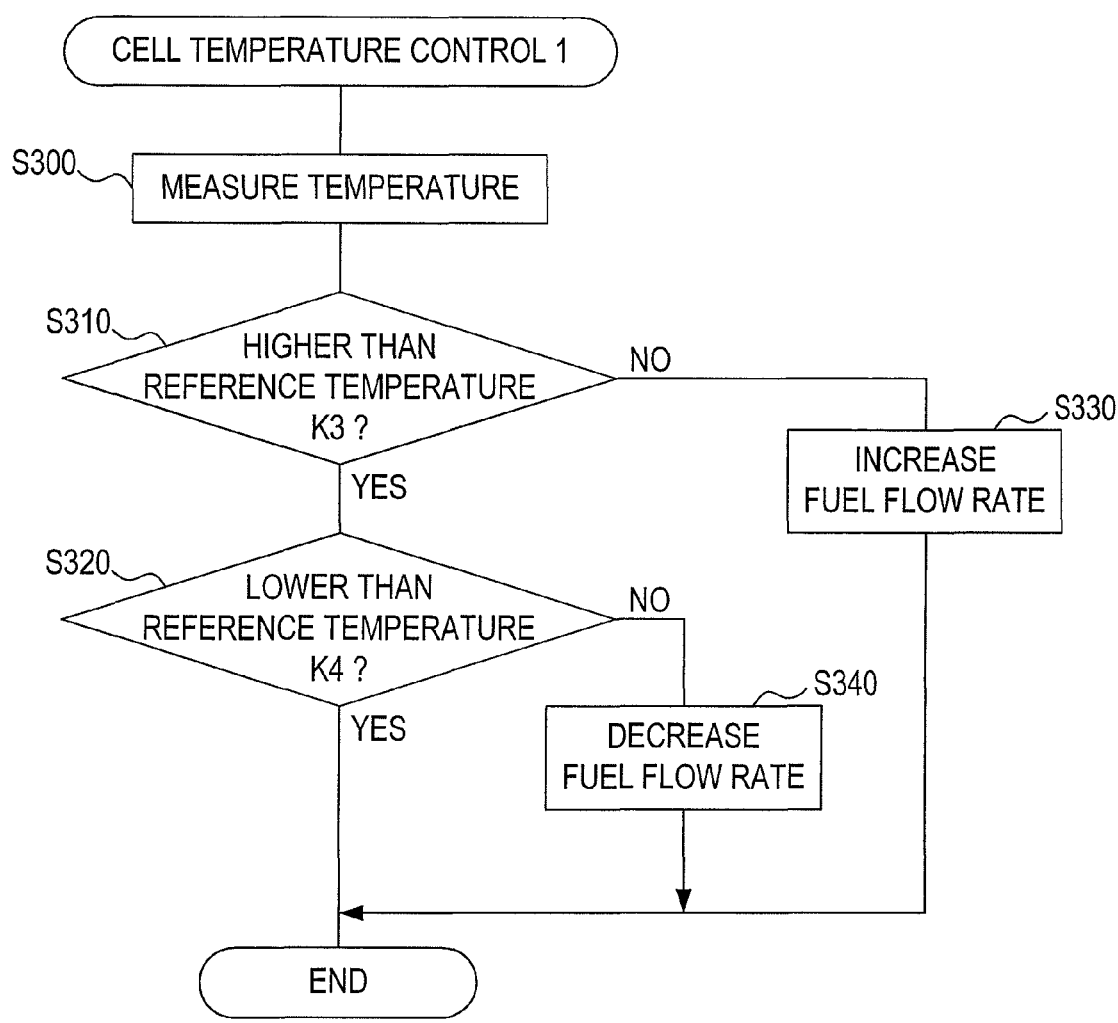
FIG. 10 is a flowchart illustrating a cell temperature control 1.

In the present process, the temperature of the respective cells 23 is measured in step 300, as shown in FIG. 10. The temperature can be obtained, for example, by disposing a sensor such as a thermocouple or the like in the vicinity of the cells 23.

In the subsequent step 310, it is determined whether the temperature of the cells 23 is higher than a reference temperature K3. If positively determined, the process moves to step 320. If negatively determined, the process moves to step 330.

In step 330, since the temperature of the cells 23 is lower than a desired temperature range (K3-K4: K3<K4), a process of increasing the fuel flow rate is performed to raise the temperature. The present process is ended.

In step 320, it is determined whether the temperature of the cells 23 is lower than a reference temperature K4. If positively determined, the present process is ended. If negatively determined, the process moves to step 340.

In step 340, since the temperature of the cells 23 is higher than the desired temperature range, a process of decreasing the fuel flow rate is performed to lower the temperature. The present process is ended.

Thereby, the temperature of the cells 23 can be controlled into the desired temperature range. When the temperature is in the desired range, electrical power is considered the same if other conditions are the same.

(4) Cell Temperature Control 2

Cell temperature control 2 is a process to feedback control the temperature of the respective cells 23 to be constant by adjusting the supply amount of air. Since air serves as cooling gas, adjustment of air flow rate allows temperature control.

Figure 11:
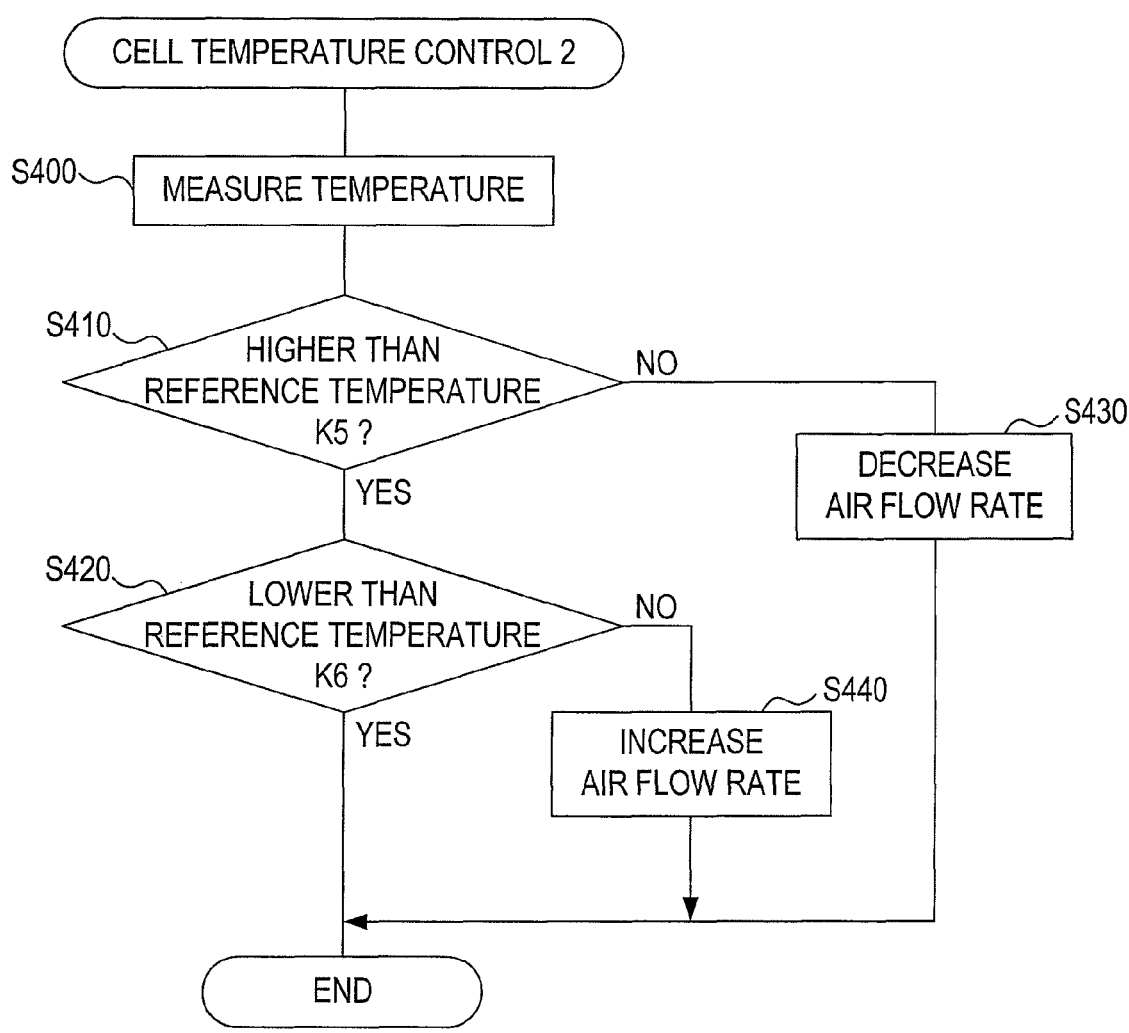
FIG. 11 is a flowchart illustrating a cell temperature control 2.

In the present process, the temperature of the respective cells 23 is measured in step 400, as shown in FIG. 11.

In the subsequent step 410, it is determined whether the temperature of the cells 23 is higher than a reference temperature K5. If positively determined, the process moves to step 420. If negatively determined, the process moves to step 430.

In step 430, since the temperature of the cells 23 is lower than a desired temperature range (K5-K6: K5<K6), a process of decreasing the air flow rate is performed to raise the temperature. The present process is ended.

In step 420, it is determined whether the temperature of the cells 23 is lower than a reference temperature K6. If positively determined, the present process is ended. If negatively determined, the process moves to step 440.

In step 440, since the temperature of the cells 23 is higher than the desired temperature range, a process of increasing the air flow rate is performed to lower the temperature. The present process is ended.

Thereby, the temperature of the cells 23 can be controlled into the desired temperature range. When the temperature is in the desired range, electrical power is considered the same if other conditions are the same.

(5) Fuel Exhaust Concentration Control

Fuel exhaust concentration control is a process to analyze constituents contained in fuel gas exhaust, adjust the supply amount of fuel gas and air, and control the state of electricity generation (for example, voltage) in the respective cells 23 to be constant.

Figure 12:
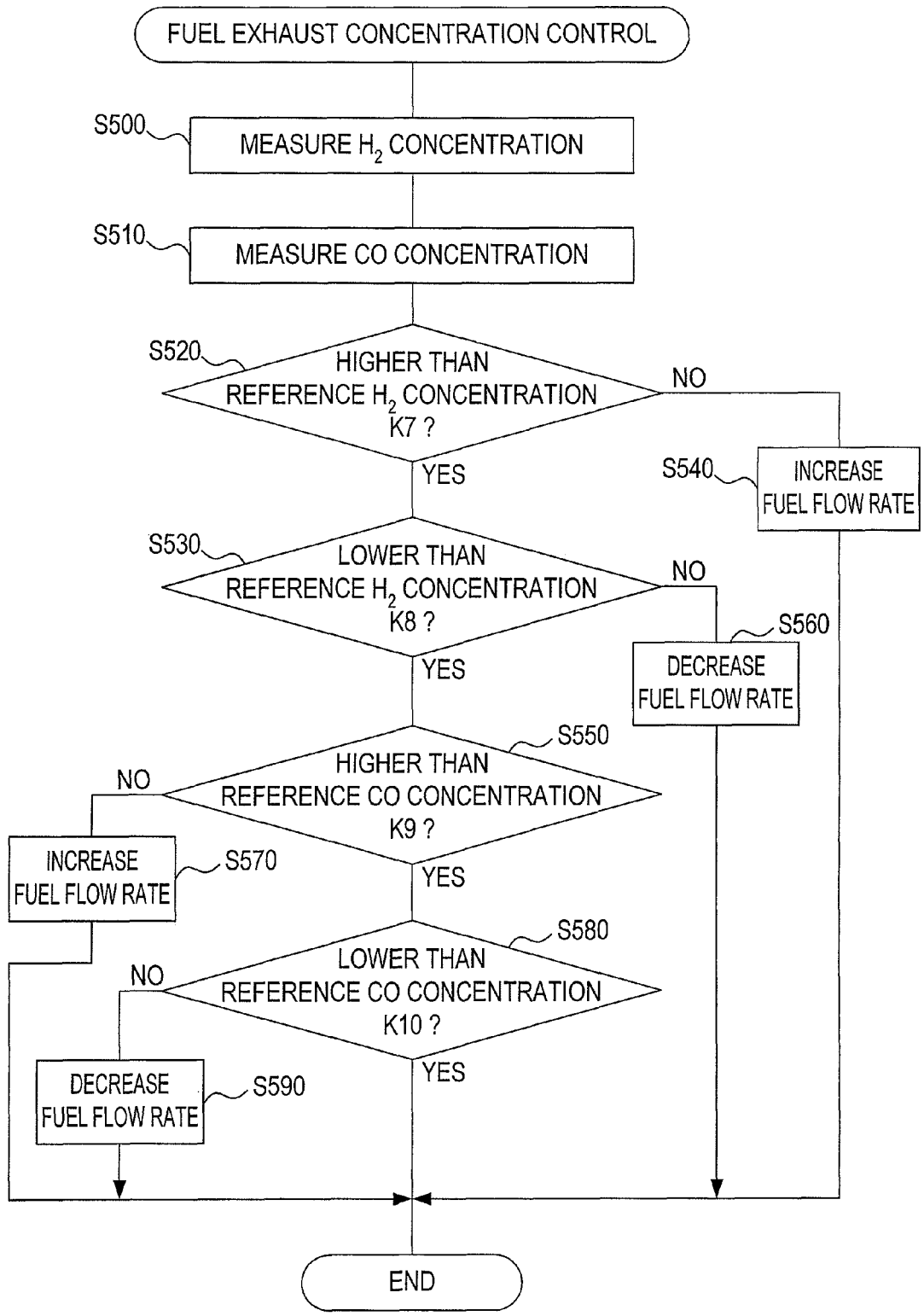
FIG. 12 is a flowchart illustrating a fuel exhaust concentration control.

In the present process, $H_2$ gas concentration in fuel gas exhaust is measured in step 500, and CO gas concentration is measured in step 510, as shown in FIG. 12.

In the subsequent step 520, it is determined whether the $H_2$ gas concentration in fuel gas exhaust is higher than a reference $H_2$ concentration K7. If positively determined, the process moves to step 530. If negatively determined, the process moves to step 540.

In step 540, since the $H_2$ gas concentration is lower than a desired concentration range (K7-K8: K7<K8), a process of increasing the fuel flow rate is performed to raise the $H_2$ gas concentration (accordingly, to increase electrical power). The present process is ended.

In step 530, it is determined whether the $H_2$ gas concentration is lower than a reference $H_2$ concentration K8. If positively determined, the process moves to step 550. If negatively determined, the process moves to step 560.

In step 560, since the $H_2$ gas concentration is higher than the desired concentration range, a process of decreasing the fuel flow rate is performed to lower the $H_2$ gas concentration (accordingly, to decrease electrical power). The present process is ended.

Also, in aforementioned step 550, it is determined whether the CO gas concentration is higher than a reference CO concentration K9. If positively determined, the process moves to step 580. If negatively determined, the process moves to step 570.

In step 570, since the CO gas concentration is lower than a desired concentration range (K9-K10: K9<K10), a process of increasing the fuel flow rate is performed to raise the CO gas concentration (accordingly, to increase electrical power). The present process is ended.

In step 590, it is determined whether the CO gas concentration is lower than a reference CO concentration K10. If positively determined, the present process is ended. If negatively determined, the process moves to step 590.

In step 590, since the CO gas concentration is higher than the desired concentration range, a process of decreasing the fuel flow rate is performed to lower the CO gas concentration (accordingly, to decrease electrical power). The present process is ended.

That is, in the present process, electrical power is adjusted by controlling the state of supplying fuel gas depending on the state of constituents in the fuel gas exhaust. Therefore, electrical power of the respective cells 23 can be homogenized. Thereby, electricity is efficiently generated in the stack 21.

(6) Air Exhaust Concentration Control

Air exhaust concentration control is a process to analyze constituents contained in air exhaust, adjust the supply amount of air depending on the amount of the constituents, and control the state of electricity generation (for example, voltage) in the respective cells 23 to be constant.

Figure 13:
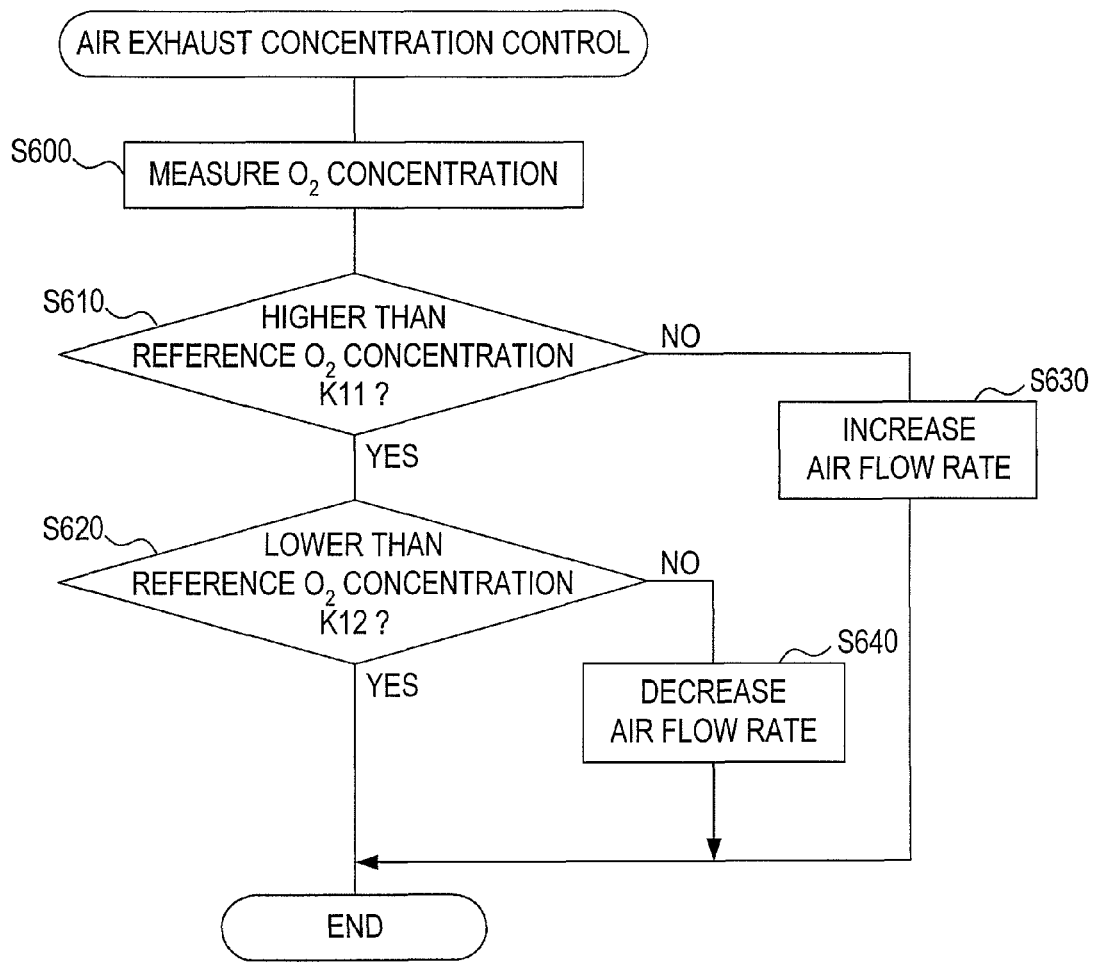
FIG. 13 is a flowchart illustrating an air exhaust concentration control.

In the present process, $O_2$ gas concentration in air exhaust is measured in step 600, as shown in FIG. 13.

In the subsequent step 610, it is determined whether the $O_2$ gas concentration in air exhaust is higher than a reference $O_2$ concentration K11. If positively determined, the process moves to step 620. If negatively determined, the process moves to step 630.

In step 630, since the $O_2$ gas concentration is lower than a desired concentration range (K11-K12: K11<K12), a process of increasing the air flow rate is performed to raise the $O_2$ gas concentration (accordingly, to increase electrical power). The present process is ended.

In step 620, it is determined whether the $O_2$ gas concentration is lower than a reference $O_2$ concentration K12. If positively determined, the present process is ended. If negatively determined, the process moves to step 640.

In step 640, since the $O_2$ gas concentration is higher than the desired concentration range, a process of decreasing the air flow rate is performed to lower the $O_2$ gas concentration (accordingly, to decrease electrical power). The present process is ended.

That is, in the present process, electrical power is adjusted by controlling the state of supplying air depending on the state of constituents in the air exhaust. Therefore, electrical power of the respective cells 23 can be homogenized. Thereby, electricity is efficiently generated in the stack 21.

It is desirable that each of the aforementioned processes is performed per cell unit. However, for example, the respective cells may be divided into groups and each of the processes may be performed per group unit. For example, the cells 23 can be grouped into the outer first, second, ninth, and tenth-layer cells 23 and the third to eighth-layer cells 23.

f) The following describes the effect of the present embodiment.

In the present embodiment, the plurality of bolts 29, 30, 37, 38, 40 for supplying fuel gas and the plurality of bolts 31, 32, 34, 35, 36 for supplying air are provided in a manner to penetrate the solid electrolyte fuel cell stack 21. The different bolt 29, 30, 37, 38, 40 for fuel gas and the different bolt 31, 32, 34, 35, 36 for air respectively communicate with the different solid electrolyte fuel cells 23 (particularly, the fuel gas flow paths 45 and the air flow paths 53 as the inner flow paths of the cells 23).

Accordingly, when supplying air and fuel gas to the respective solid electrolyte fuel cells 23 via the respective vents 75 formed by the respective bolts 29-32, 34-38, 40 inside the solid electrolyte fuel cell stack 21, the state of supplying air and fuel gas (for example, the supply amount, supply temperature, and so on) to the different solid electrolyte fuel cells 23 can be controlled.

Consequently, for example, when the temperature or the electrical power of the cells 23 on both ends in the stack-layering direction of the solid electrolyte fuel cell stack 21 is low, the supply amount of air or fuel gas to the cells 23 on both ends may be changed to raise the temperature of the cells 23 on both ends so as to homogenize the temperature inside the stack 21. Also, electrical power of the cells 23 on both ends can be raised to improve electrical power of the whole stack 21.

Especially, in the case of the stack 21 in which the cells 23 are electrically connected in series in the stack-layering direction, electrical power of each of the cells 23 can be homogenized. As a result, electrical power of the whole stack 21 can be increased.

That is, the internal manifold structure characteristic to the present invention can make the stack 21 compact and also increase electrical power performance of the whole stack 21 by homogenization, and so on, of electrical power of each of the cells 23. Thus, there is a remarkable effect that energy density of the stack 21 can be improved.

It should be noted that the present invention is not limited to the above-described embodiment, and can be carried out in various ways without departing from the scope of the present invention.

What is claimed is:

1. A solid electrolyte fuel cell stack comprising:
   solid electrolyte fuel cells stack-layered therein, each of the solid electrolyte fuel cells including a cell body and a frame portion that encloses the cell body in a planar direction of the cell body, the cell body comprising a solid electrolyte having a fuel electrode, which contacts with fuel gas, and an air electrode, which contacts with oxidant gas; and
   interconnectors disposed between the respective solid electrolyte fuel cells to separate a gas flow between the solid electrolyte fuel cells and secure electric conduction between the solid electrolyte fuel cells,
   wherein vents for supplying the fuel gas are provided in the frame portions of the solid electrolyte fuel cells in such a manner that the vents for supplying the fuel gas penetrate a part or a whole of the solid electrolyte fuel cell stack in a stack-layering direction of the stack,
   wherein different vents for supplying the fuel gas communicate with the different solid electrolyte fuel cells, through holes forming respective different vents for supplying the fuel gas;
   wherein bolts are inserted through the through holes to press each of the solid electrolyte fuel cells which are stacked, in a stack-layering direction, so that the solid electrolyte fuel cells can be restrained in one body, and
   at least two of the vents for supplying the fuel gas pass through more than one of the interconnectors in the stack-layering direction but do not communicate with each cell body.

2. The solid electrolyte fuel cell stack according to claim 1, further comprising vents for supplying the oxidant gas, the vents for supplying the oxidant gas are provided in the frame portions of the solid electrolyte fuel cells, wherein the different vents that supply oxidant gas communicate with the different cell bodies.

3. The solid electrolyte fuel cell stack according to claim 1 wherein a state of each gas is independently controllable per a different vent.

4. The solid electrolyte fuel cell stack according to claim 3, further comprising vents for supplying the oxidant gas, wherein a state of the oxidant gas is independently controllable per the different vents that supply the oxidant gas.

5. The solid electrolyte fuel cell stack according to claim 1 wherein two or more vents for supplying the oxidant gas are provided to control temperature of each cell.

6. The solid electrolyte fuel cell stack according to claim 1 wherein two or more vents for supplying the fuel gas are provided to control electricity generating volume of each cell.

7. The solid electrolyte fuel cell stack according to claim 1 wherein a state of the gas supplied to the solid electrolyte fuel cell disposed at an end in the stack-layering direction of the solid electrolyte fuel cell stack is controlled.

8. The solid electrolyte fuel cell stack according to claim 1 wherein a state of the solid electrolyte fuel cell disposed at an end in the stack-layering direction of the solid electrolyte fuel cell stack is feedback controlled to a prescribed state.

9. The solid electrolyte fuel cell stack according to claim 1 wherein the bolts are hollow bolts and are disposed and penetrate the solid electrolyte fuel cell stack in the stack-layering direction, and internal holes of the hollow bolts are used as the vents of gas.

10. The solid electrolyte fuel cell stack according to claim 1, wherein each of the at least two of the vents for supplying the fuel gas passes through all of the interconnectors in the stack-layering direction, and each of the at least two of the vents for supplying the fuel gas does not communicate with each cell body.

11. The solid electrolyte fuel cell stack according to claim 1, wherein the at least two of the vents for supplying the fuel gas pass through all of the interconnectors in the stack-layering direction, and each of the at least two of the vents for supplying the fuel gas communicates with a single cell body.

12. The solid electrolyte fuel cell stack according to claim 1, further comprising at least two vents for supplying the oxidant gas that pass through more than one of the interconnectors in the stack-layering direction but do not communicate with each cell body, and the at least two vents for supplying the oxidant gas are provided in the frame portions of the solid electrolyte fuel cells.

13. A solid electrolyte fuel cell stack comprising:
    solid electrolyte fuel cells stack-layered therein, each of the solid electrolyte fuel cells including a cell body and a frame portion that encloses the cell body in a planar direction of the cell body, the cell body comprising a solid electrolyte having a fuel electrode, which contacts with fuel gas, and an air electrode, which contacts with oxidant gas; and
    interconnectors disposed between the respective solid electrolyte fuel cells to separate a gas flow between the solid electrolyte fuel cells and secure electric conduction between the solid electrolyte fuel cells,
    wherein vents for supplying the oxidant gas are provided in the frame portions of the solid electrolyte fuel cells in such a manner that the vents for supplying the oxidant gas penetrate a part or a whole of the solid electrolyte fuel cell stack in a stack-layering direction of the stack,
    wherein different vents for supplying the oxidant gas communicate with the different solid electrolyte fuel cells, through holes forming respective different vents for supplying the oxidant gas;
    wherein bolts are inserted through the through holes to press each of the solid electrolyte fuel cells which are stacked, in a stack-layering direction, so that the solid electrolyte fuel cells can be restrained in one body, and
    at least two of the vents for supplying the oxidant gas pass through more than one of the interconnectors in the stack-layering direction but do not communicate with each cell body.

* * * * *